United States Patent [19]

Legueu

[11] Patent Number: 4,743,059

[45] Date of Patent: May 10, 1988

[54] MOBILE SANITARY UNIT

[76] Inventor: Paul Legueu, 85, Avenue de Mazy, 44380 Pornichet, France

[21] Appl. No.: 71,369

[22] Filed: Jul. 9, 1987

[30] Foreign Application Priority Data

Jul. 10, 1986 [FR] France ................................ 86 10052

[51] Int. Cl.[4] .................................................. B60P 3/00

[52] U.S. Cl. .................................... 296/24 R; 414/495

[58] Field of Search ........................ 296/24 R; 414/495; 280/766.1, 47.13 R, 43.23

[56] References Cited

U.S. PATENT DOCUMENTS

| | | | |
|---|---|---|---|
| 2,358,446 | 9/1944 | Couse | 296/24 R |
| 2,677,571 | 5/1954 | Williams | 296/24 R |
| 2,817,846 | 12/1957 | Stift | 296/24 R |
| 3,119,503 | 1/1964 | Herpick | 414/495 |
| 4,181,347 | 1/1980 | Clark | 296/24 R |

FOREIGN PATENT DOCUMENTS 3201672 9/1983 Fed. Rep. of Germany .

*Primary Examiner*—Robert R. Song
*Attorney, Agent, or Firm*—Horst M. Kasper

[57] ABSTRACT

This invention relates to a mobile sanitary unit, which can function autonomously and in any site. The unit comprises a sealed aseptic container with the dimensions of a standard 20-foot container. The container has a door giving access to an operating theater, changing facilities, and storage cupboards. An electrical supply unit is disposed in a housing in the front wall of the container, for connection to an external generator. The unit includes telescopic legs at all four corners of the container mounted on supports which may be folded flat against the container wall for transport, and deployed so that the container may be on-loaded and then off-loaded and used on site standing on its legs. The unit may be transported by an articulated truck comprising a tractor and low-platform semitrailer. An electrical generator set is mounted on the saddle of the semi-trailer. The unit may also be transported by air and its weight of 3.5 tonnes enables it to be dropped by parachute.

17 Claims, 5 Drawing Sheets

MOBILE SANITARY UNIT

BACKGROUND OF THE INVENTION

This invention relates to a mobile sanitary unit which can function autonomously and in different terrains and can be used in isolated places not provided with hospital facilities nor sources of energy. Such a unit may form an operating theater or surgery, for example, which may be utilized in any desired place, for example on the site of a disaster.

DESCRIPTION OF THE PRIOR ART

In hospitals, surgeries and operating theater are provided with sophisticated equipment enabling different actions to be undertaken. However, the problem becomes acute in isolated areas, such as desert regions, where mobile sanitary antennas usually only include rudimentary equipment not enabling major or serious operations to be performed. In these desert regions, often deprived of dispensaries and sanitary antennas, and in which disasters or catastrophes may occur, there is a requirement for much more sophisticated installations to prevent risks of epidemics or to save the badly wounded in wars or local conflicts or even in the case of natural disasters or accident.

Until now, specialists were deterred from the installation of sophisticated equipment in a mobile unit because of the technical problems encountered, in respect of sources of energy, the sophistication of the material or the climatic conditions. In particular, the problems remain of housing operating theaters and the like in a sufficiently small space to enable the units to be transported by road and air and even dropped onto remote sites with all equipment to make them autonomous in the absence of auxiliary sanitary installations.

OBJECTS OF THE INVENTION

An object of the invention is to overcome the above difficulties and problems.

Another object of the invention is to provide a mobile sanitary unit including an operating theater.

Yet another object of the invention is to provide a sanitary unit which is air and road transportable within normal transport conditions.

DESCRIPTION OF THE INVENTION

The present invention provides a mobile sanitary unit comprising a sealable aseptic container of standard road and air transport dimensions, medical equipment within said container enabling surgical operations to be performed, electrical supply means for connection to a mobile source of electrical energy, and at least three legs and leg supports mounted in front and rear portions of said container, said legs being mounted for vertical translation in said supports, and said supports being mounted in said container for rotation between a transport position in which said supports are folded against the container walls with said legs retracted within the standard container dimensions, and a deployed position in which said supports project from the container walls and said legs are extended to stand the unit on the ground.

The container may be of reduced dimensions, and preferably meets the dimensional standards for a 20-foot container; this enables the unit to be transported as a normal load, that is to say without forming a special "outsize" transport. The unit may be transported by truck, for example an articulated vehicle with tractor and semi-trailer, on varied terrains off-highway.

The unit may be made with a sufficiently low weight, for example 3.5 tonnes, for it to be air-transportable and even dropped by parachute.

The legs enable the unit to be on-loaded, for example onto the platform of an on-highway truck; the deployment of the supports enable the support base of the unit to be increased in size when the unit is standing on the ground on site; when the unit is standing on the legs it is isolated from the ground.

The invention also provides a vehicle set comprising a mobile sanitary unit as described above and a truck presenting a platform on which the unit is received. The truck may be an articulated truck, the semi-trailer preferably presenting a low platform; an electrical generator set is mounted on the truck, preferably on the saddle of the semi-trailer, so that the vehicle set may be completely autonomous in electrical energy; the unit may therefore be operational even during transport, which enables patients to be transported and supervised during the transport, or the operating theater to be prepared while it is being taken to the utilization site, for example.

DESCRIPTION OF THE DRAWINGS

Other features and advantages of the invention will appear from the following description, given by way of example with reference to the accompanying drawings, in which.

Figure 1:
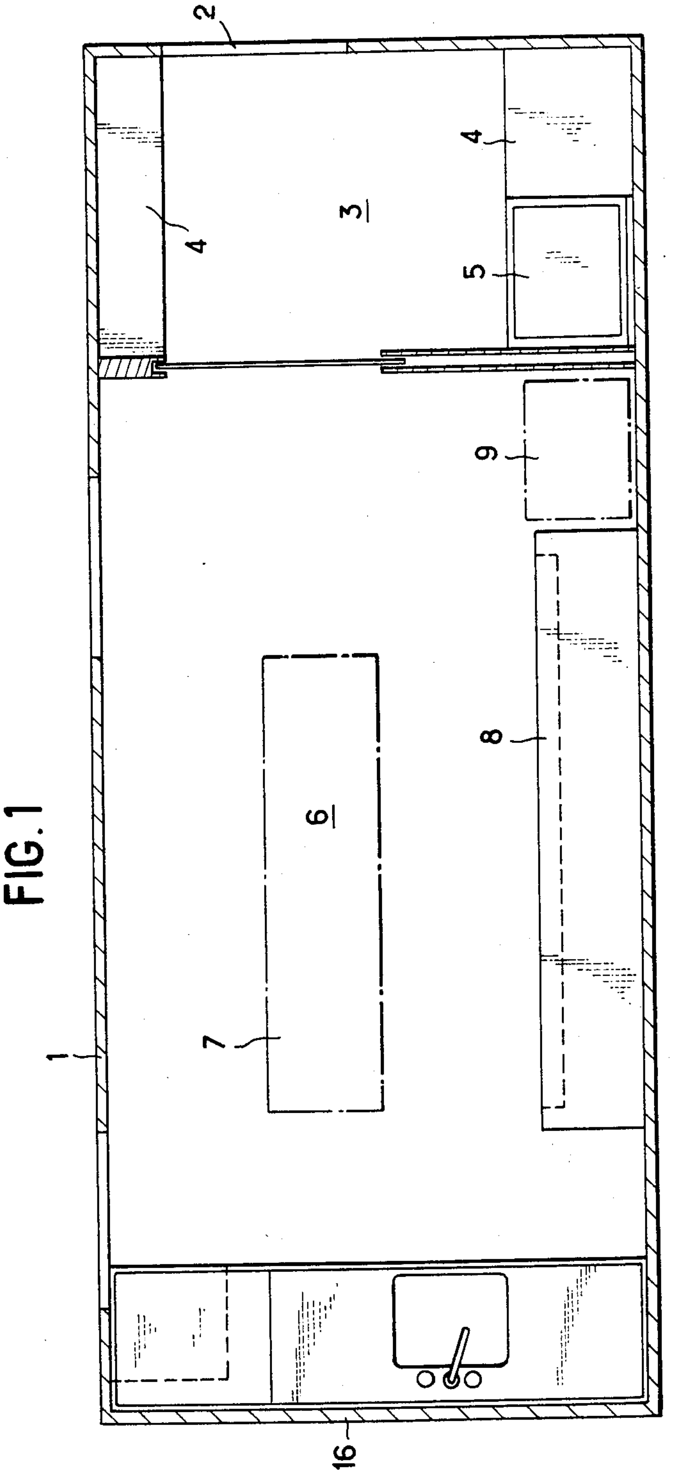
FIG. 1 is a top sectional view of a mobile sanitary unit in accordance with an embodiment of the invention.
Figure 2:
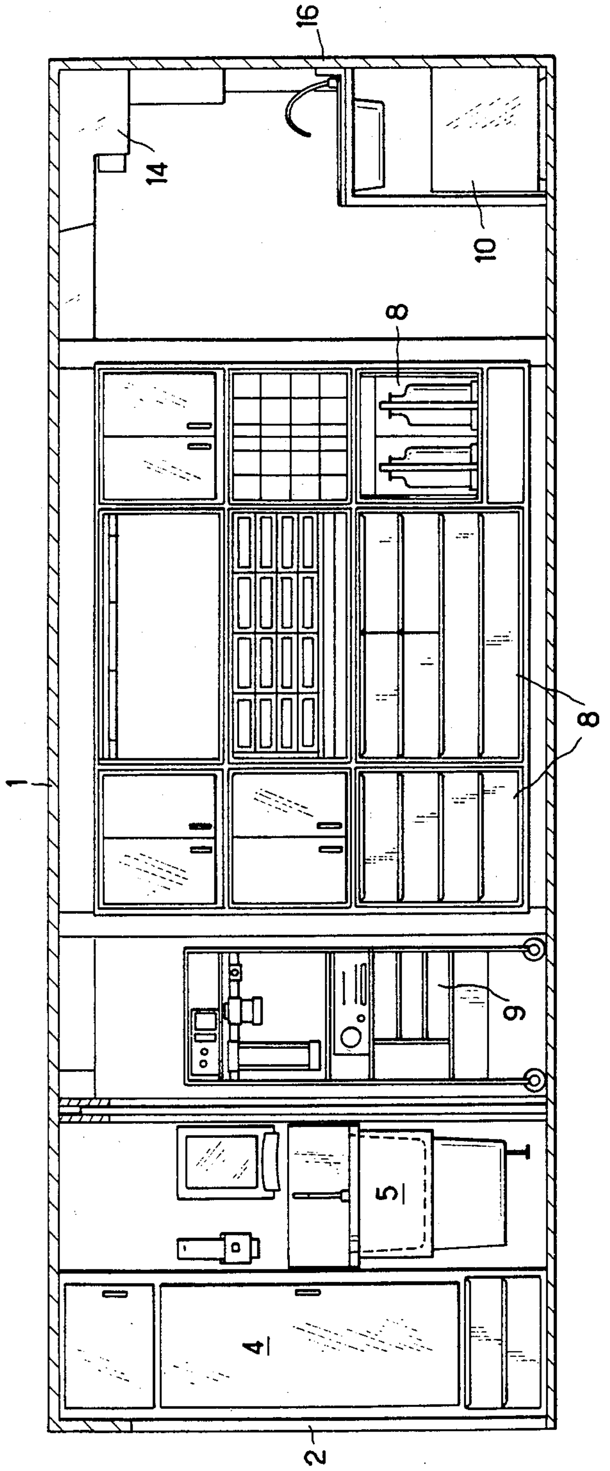
FIG. 2 is a sectional side view of the unit of FIG. 1.
Figure 3:
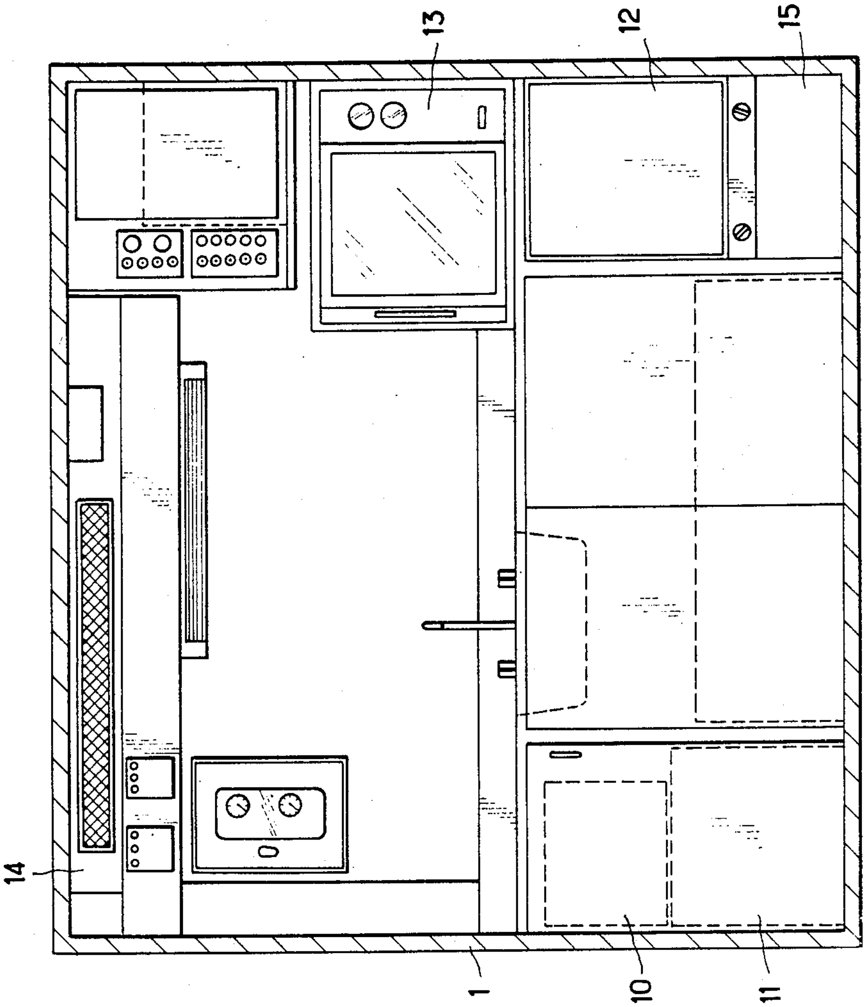
FIG. 3 is a sectional view of the front of the unit of FIG. 1.

The sanitary unit shown in FIGS. 1 to 5 comprises a case 1 whose outer dimensions correspond to the standards for a container of the kind known as "20 feet"; this case is sealed and comprises an access door 2, disposed at the rear of the container by way of example, the case being designed to form an aseptic unit; in particular, it includes an air conditioner which recycles the air so as to minimize pollution from external air.

The inside of the container is fitted out so as to form an operating theater (in this example) which comprises a room 3 forming a changing room and into which opens the door 2; this room is provided with closets 4 and a wash-basin 5. The room is used for the preparation of the medical personnel, and also as entrance through which the patients penetrate into the second room 6 forming the operating theater itself and comprising, in particular, an operating table 7 and cupboards 8 for storing the various equipment used in operations. A mobile reanimation unit 9 is stored along the cupboards 8.

The apparatus requiring a supply of electrical energy are grouped at the end of the room 6, namely a vacuum generator 10 provided with a vacuum reservoir 11, a storage refrigerator 12, a sterilizer 13 and an air conditioning unit 14. Advantageously all this equipment requiring electrical energy are grouped at the front and an electrical supply unit 15 is provided, including a floating battery, housed in a compartment which opens to the exterior in the front wall 16 of the container; this electrical unit is provided with connectors enabling connection to an external source of electrical energy and it preferably includes a second set of connectors enabling supply in parallel of a second mobile sanitary unit of the same type.

Figure 4:
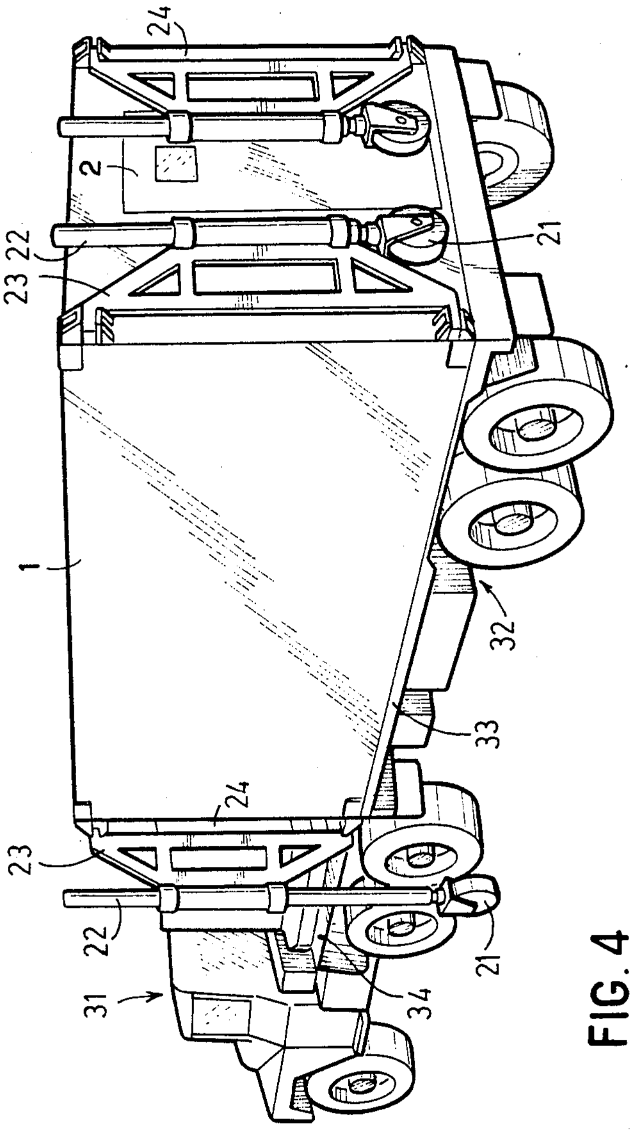
FIG. 4 is a perspective view of the unit mounted on an articulated truck for transport.

As shown particularly in FIG. 4, the case is advantageously provided with legs 22 which may be provided with wheels 21 or feet; the legs 22 are mounted for vertical translation in supports 23 which are mounted for rotation about vertical axes 24 extending at the corners of case 1. Each support 23 is displaceable between two positions, a transport position, as shown for the rear legs in FIG. 4, in which the support is folded back against the rear wall 25 of the case 1, the telescopic legs being raised so that the leg and support assemblies do not project outside the standard dimensions of the container. The supports 23 may be deployed into a utilization position as shown in FIG. 4 for one of the front legs, in this position, the support 23 is perpendicular to the side wall of the container 1 and the telescope leg 22 can then descend to contact the ground. In particular, this enables the container to be off-loaded from the vehicle transporting it without having to use hoists, enabling the mobile unit to be off-loaded in remote places. Also, the legs may be used when the mobile unit is left in the position of use, in order to isolate it from the ground. Moreover, the wheels 21 enable the case to be moved around by hand on the site of utilization. The wheels may be replaced, if desired, by feet or pads presenting a bigger contact area to the ground.

Figure 5:
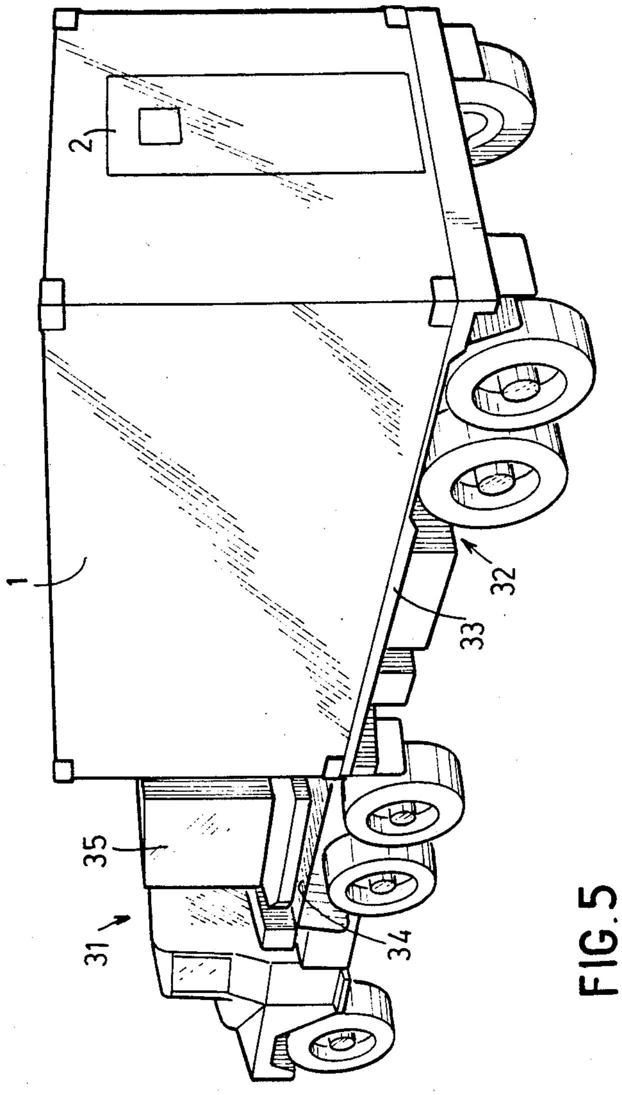
FIG. 5 is a perspective view of a complete truck forming an autonomous unit.

As shown in FIGS. 4 and 5, the mobile sanitary unit may be mounted on an articulated truck or road train comprising a tractor 31 and a semi-trailer 32. This equipment is a truck which can drive in all terrains and the semi-trailer has a low platform 33, which enables the vehicle to be driven in all normal transport conditions, that is to say it does not constitute a special "outsize" transport vehicle.

As shown in FIG. 5, the saddle 34 of the semitrailer, that is to say the front part of the semitrailer which is coupled onto the fowing device (fifth wheel) of the tractor 31, bears an autonomous electrical generator 35 comprising a thermal engine, an alternator and a fuel reservoir; this electrical generator is connected to the electrical connection apparatus provided in the front wall 16 of the container 1 so that the sanitary unit is operational, even during transport, thanks to the road unit described above. In particular, this enables actions which are not too delicate to be undertaken, such as supervision of a patient or preparation of the theater for use on arrival at the site of a catastrophe, for example. Once arrived at the place of use, it is possible to off-load the container 1 while keeping the electrical connection with the electrical generator 35 so that there is never a moment when the electrical supply is interrupted, and the personnel can continue to work in the unit during the off-loading operations.

The usage for the sanitary unit of a rectangular case having the dimensions of a standardized container enable the units to be stored in a reduced space since they may be stached on top of each other.

A particular advantage of this sanitary unit is its mobility and reduced size. Also, due to the low platform of the semi-trailer, the truck with the unit on it can pass through standard tunnels and the truck is not restricted by any particular regulations. It can be driven along all roads and cross-country even along tracks which are generally unsuitable for road vehicles.

Moreover, its installation and transfer from one site to another are very easy, because of the way the case is taken in charge by the transport vehicle.

I claim:

1. A mobile sanitary unit comprising a sealable aseptic container of standard road and air transport dimensions, medical equipment within said container enabling surgical operations to be performed, electrical supply means for connection to a mobile source of electrical energy, and at least three legs and leg supports mounted in front and rear portions of said container, said legs being mounted for vertical translation in said supports, and said supports being mounted in said container for rotation between a transport position in which said supports are folded against the container walls with said legs retracted within the standard container dimensions, and a deployed position in which said supports project from the container walls and said legs are extended to stand the unit on the ground.

2. A unit as claimed in claim 1, including four of said legs and leg supports mounted at respective corners of said case.

3. A unit as claimed in claim 2 wherein said legs are telescopic.

4. A unit as claimed in claim 2 wherein said legs are provided with respective wheels.

5. A unit as claimed in claim 2 wherein said legs are provided with respective feet.

6. A unit as claimed in claim 1 wherein said container meets the dimensional standards for a container of 40-foot type.

7. A unit as claimed in claim 6 wherein the weight of said unit is substantially 3.500 kilograms at most.

8. A unit as claimed in claim 1 wherein said electrical supply means is disposed in a housing defining an opening to the outside of the case and disposed in an end wall of said case.

9. A unit as claimed in claim 8 wherein said electrical supply means and said housing are disposed at a front end of said case, said medical equipment including electrically consuming apparatus disposed adjacent to said front end.

10. A unit as claimed in claim 9 wherein said electrical supply means includes a floating battery.

11. A unit as claimed in claim 1 wherein said electrical supply means includes means for supplying electricity to another similar unit in parallel.

12. A vehicle set comprising a unit as claimed in claim 1 and a truck presenting a platform for receiving said unit.

13. A vehicle set as claimed in claim 12 wherein said truck comprises a semi-trailer presenting said platform and a tractor for coupling with said semi-trailer.

14. A vehicle set as claimed in claim 12 wherein said platform is low enough to pass beneath the unit standing on the ground on said legs when fully extended, whereby said unit may be on and off-loaded without external lifting.

15. A vehicle set as claimed in claim 12 wherein said truck comprises an electrical generator for generating electricity for said unit through said electrical supply means.

16. A vehicle set as claimed in claim 15 wherein said truck comprises a semi-trailer presenting a platform for receiving said unit and a saddle portion for coupling with a tractor, said generator being mounted on said saddle portion.

17. A vehicle set as claimed in claim 12, wherein said container meets the dimensional standards for a container of 20-foot type.

* * * * *